United States Patent Office 3,736,160
Patented May 29, 1973

3,736,160
FIBROUS ZIRCONIA CEMENT COMPOSITES
Bernard H. Hamling, Warwick, N.Y., assignor to Union
Carbide Corporation, New York, N.Y.
No Drawing. Continuation-in-part of applications Ser.
No. 700,031, Jan. 24, 1968, and Ser. No. 717,367,
Mar. 29, 1968. This application May 11, 1970, Ser.
No. 36,410
Int. Cl. C04b 35/48
U.S. Cl. 106—57                                    24 Claims

ABSTRACT OF THE DISCLOSURE

Composites comprising fibrous zirconia in a matrix of zirconia are prepared by subjecting fibrous zirconia impregnated with a mixture of a liquid containing a zirconium compound and a refractory powder to a temperature sufficient to insure conversion of substantially all of the zirconium compound to zirconia. The composites are useful as heat shields, insulation and the like.

---

This application is a continuation-in-part of Ser. No. 700,031, filed Jan. 24, 1968, and of Ser. No. 717,367, filed Mar. 29, 1968.

The invention relates to a method for producing composites of fibrous zirconia in a matrix of zirconia, and to the composite thus produced. In one aspect, the invention relates to composites comprising fibrous zirconia in a matrix of microporous zirconia and to the method for making such composites.

In U.S. Pat. No. 3,385,915, patented on May 28, 1968, there is disclosed, inter alia, a process for the preparation of fibrous zirconia. The present invention relates to a method for the preparation of composites prepared from the fibrous zirconia disclosed in said patent and a zirconia cement.

It is an object of this invention to provide fibrous zirconia/zirconia composites.

It is another object of this inventon to provide composites comprising fibrous zirconia in a matrix of microporous zirconia.

It s still another object of the invention to provide heat shields, flame barriers, insulation, corrosion barriers, and the like, composed of fibrous zirconia in a matrix of microporous zirconia.

Other objects of the invention will be apparent from a reading of the following descriptions of the invention.

The fibrous zirconia/cement composites of the invention can be prepared by impregnating fibrous zirconia with a mixture of a liquid containing a zirconium compound and a refractory powder, followed by subjecting the thus impregnated fibrous zirconia to a temperature sufficient to convert the zirconium compound to zirconia.

The fibrous zirconia that is employed in the invention can be in the form of tow, yarn, woven fabrics, felts, roving, knits, braids, paper, and the like. The fibrous zirconia can be prepared by the method disclosed in U.S. Pat. No. 3,385,915, the disclosure of which is incorporated herein by reference. Preferably, the fibrous zirconia is in the form of yarn, felt, especially felt wherein the fibers have been interlocked by needle punching or other method, or woven fabric.

It is preferred that the zirconia fibers that are used in the invention be stabilized. The stabilization of zirconia in either the tetragonal or cubic form is known. For instance, the preparation of fibrous zirconia stabilized in the tetragonal form is disclosed in my co-pending application Ser. No. 700,031, entitled "Stabilized Tetragonal Zirconia Fibers and Textiles," filed Jan. 24, 1968, the disclosure of which is incorporated herein by reference. The preferred stabilizer oxide for use in stabilizing the fibrous zirconia in the tetragonal form is yttria. The stabilization of zirconia fibers in the cubic form by incorporating therein from about 5.5 mole percent to about 9.6 mole percent of yttria is disclosed in my copending application Ser. No. 717,367, filed Mar. 29, 1968, the disclosure of which is incorporated herein by reference.

The zirconia cement that is employed in the application comprises a mixture of a liquid containing a zirconium compound and a refractory powder. The liquid containing the zirconium compound is preferably a solution of a zirconium compound, and more preferably, an aqueous solution of the zirconium compound. The zirconium compound employed can be, for example, zirconyl chloride, basic zirconium chloride (zirconium hydroxychloride), zirconium acetate, zirconium citrate, zirconium oxalate, and the like. Preferably, the liquid containing the zirconium compound also contains a compound of a metal whose oxide will stabilize the zirconia in the tetragonal or cubic form. Such metals whose oxides stabilize the zirconium in the tetragonal or cubic form include yttrium, calcium, magnesium, cerium, and certain other rare earth metals. Specific illustrative compounds of such metals include yttrium acetate, yttrium chloride, cerous chloride, calcium chloride, magnesium chloride, rare earth metal chlorides, and the like. Preferably, the stabilizer oxide is yttria, therefore, the yttrium compounds such as yttrium acetate and yttrium chloride are preferably employed in the liquid containing the zirconium compound. The stabilizer oxide is employed in a proportion sufficient to stabilize the fibrous zirconia in the tetragonal or cubic form, as is disclosed, for instance, in the above-mentioned Ser. Nos. 700,031 and 717,367.

The refractory powder which is employed in the cement can be a refractory metal oxide, zircon, barium titanate, strontium titanate, or other refractory powder. The refractory powder can be prepared by known procedures. However, when the refractory powder employed is a refractory metal oxide, it is preferably prepared by the process disclosed in an application entitled "Finely Divided Metal Oxides and Sintered Objects Therefrom (Case No. 1)" filed on the same day as this application in the names of B. H. Hamling and A. W. Naumann, and assigned to the same assignee as this application. The disclosure of said Case No. 1 is incorporated herein by reference. The preferred refractory powders for use in preparing the cement include zirconia, hafnia, ceria, thoria, yttria, rare earth oxide, zircon, or mixtures thereof. More preferably, the refractory powder is zirconia, and most preferably, it is zirconia stabilized with a stabilizer metal oxide such as yttria, ceria, or other rare earth oxide.

The refractory powder preferably is of sub-micron size in order that it can better penetrate and fill the voids between the individual fibers, between yarn bundles, and in laminates, between fabric layers. By so doing, the powder is more effectively bonded by the liquid component to form a strong fiber to fiber bridge, thereby making the overall composite structure stronger and harder.

The proportions of the zirconium compound and refractory powder in the cement can vary over a relatively large range. For instance, the powder can be employed in amounts of from about 5 to about 95 percent, and preferably from about 50 to about 90 percent, based upon the weight of the refractory powder plus the zirconia to be produced from the liquid component of the cement.

The zirconia cement can be impregnated into the fibrous zirconia by any convenient standard impregnation procedure. Simply contacting the fibers with the cement, such as by immersing the fibers in a bath of the cement, by spraying the cement onto the fibers, or the like, can be employed. The proportion of fibrous zirconia to the zirconia matrix produced by the cement can vary over a relativley wide range. For instance, the proportion of zirconia matrix can be from about 10 to about 90 weight percent, or preferably from about 20 to about 80 weight percent, based upon the weight of the fibrous zirconia plus matrix. The exact proportion employed is dictated, to an extent, on the end use intended for the zirconia composite. For instance, composites intended for use as heat insulation will normally have a lower proportion of cement. On the other hand, composites intended for use as protection against corrosive environments such as molten aluminum will have a higher proportion of cement in order to produce a composite having a minimum of porosity.

After impregnation of the fibers with the cement, the impregnated fibers are subjected to a temperature sufficient to convert substantially all of the zirconium compound in the cement to zirconia. In the case where the cement includes an aqueous or other solution of the zirconium compound, the composite can first be dried at a temperature of, for example, from about 190° to 212° F. (if the composite is at atmospheric pressure), or about 250° to 300° F. (if the composite is held under pressure). There is thus formed a composite having sufficient green strength to enable it to be handled. Of course, the drying should be carried out so as to permit escape of volatiles. Thereafter, the composite can be subjected to higher temperatures to cure the cement, i.e., to convert the zirconium compound to zirconia. Such conversion normally begins at a temperature of from about 250° to 300° F. and is normally completed at a temperature of from about 1100° to 1500° F. Preferably, the composite is heated to a temperature of at least about 2000° F. to about 2400° F. in order to achieve maximum strength of the composite. In many cases, it is preferred to heat the composite to a temperature of, for instance, 100° F. above the intended use temperature for a period of, for example, from 1 to 4 hours. This practice insures that there will be little or no shrinkage or other dimensional change after the composite has been installed.

The heating is carried out for a period of time sufficient to insure essentially complete conversion of the zirconium compound to zirconia. Heating times of at least about 0.1 to about 1 hour at about 1100° to 1500° F. are normally sufficient. It is not appropriate to mention a maximum heating time, since the composite, in many cases, is intended for use at temperatures at or higher than the 1100° to 1500° F. range mentioned above.

The fibrous zirconia/cement composites that are produced by the method of the invention comprise fibrous zirconia in a matrix of zirconia. The zirconia martix will normally be microporous as a necessary result of the method of its manufacture wherein a zirconium compound is decomposed to produce zirconia. The decomposition products that are evolved during the conversion of that compound to zirconia causes the production of very fine pores in the zirconia matrix. The individual pores in the matrix phase normally have diameters of less than about 5 or 6 microns.

One of the desirable features of the composites of the invention is that they can be prepared in a broad range of bulk densities. For instance, the composites prepared from yttria-stabilized zirconia can be prepared having bulk densities of from about 0.5 to about 5.5 gms./cc. Since fully dense yttria-stabilized zirconia would have a density of about 6.1, the composites can be considered to range in porosity from about 10 percent, or less, to about 92 percent, or more. Bulk densities outside the range mentioned above for the zirconia system can be obtained by using filler powders having different densities than zirconia. For light weight composites intended for use as thermal insulation, porosities of the order of, for example, 65 to 90 percent are preferred. For hard, rigid composites, porosities of from about 10 to 65 percent are preferred.

In order to increase the hardness and rigidity, and lessen the porosity to 10 percent, or less, the cured composites of the invention can be reimpregnated one or more times with the liquid component of the zirconia cement. The additional impregnations(s) can be carried out as follows:

The zirconia/cement composite is emmersed in the liquid containing the zirconium compound, a vacuum is pulled in order to eliminate air from the zirconia composite, and the vacuum is then released, thereby enabling the liquid to penetrate the pores in the composite. Excess liquid is wiped off of the surface, the liquid is dried to remove the solvent (preferably by heating at moderate temperatures, as discussed above), and then heated to convert the zirconium compound to zirconia. The rate of heating is not critical (after the liquid has been dried). A maximum temperature of from about 1100° to 1500° F. is held for about one to three hours. This additional impregnation step can be repeated several times, if desired, in order to substantially increase the hardness and lessen the porosity of the zirconia/cement composite.

When drying the above-described liquid component of the zirconia cement (either in the initial production of the composite or in the reimpregnation step), as a general rule it is preferred to carry out the drying by heating at moderate temperatures rather than by air drying at ambient temperature. By so doing, any tendency toward segregation of the zirconium compound and the compound of a metal that forms a stabilizer oxide is kept to a minimum. Maximum stabilization of the zirconia is thereby achieved.

Another method for preventing segregation of the zirconium compound and the stabilizer compound is to add small amounts of aluminum or magnesium to the aqueous solution of the zirconium compound. For instance, 8 mesh aluminum powder (or magnesium powder) can be added in proportions of from about 0.5 to about 3 weight percent (based on weight of fired oxide content). The aluminum and magnesium metal readily dissolves in acidic aqueous solutions containing, for example, zirconium hydroxychloride and yttrium chloride. After dissolution of the aluminum or magnesium, the liquid is then utilized as indicated above, either with or without a filler powder.

The aluminum or magnesium apparently achieves the desired result by preventing crystallization of the zirconium compound as the solution is concentrated during drying. Rather, a gel-like material is formed (perhaps by polymerization of the metal salts present) that becomes a glassy, rather than crystalline, solid. By this means, segregation of the zirconium compound and stabilizer metal compound is prevented.

The fibrous zirconia/cement composites of the invention are useful as heat shields, flame barriers, corrosion protection barriers, and in other applications requiring resistance to high temperature and/or corrosion resistance.

The following non-limiting examples illustrate certain aspects of the invention:

EXAMPLE 1

(A) Representative preferred method of preparing liquid component-chloride base

Basic zirconium chloride (ZrOOHCl), also called zirconium hydroxychloride, such as that sold by TAM Division of National Lead Company, as an aqueous solution is used. The solution has the following properties:

Solids content:  Other elements $ZrO_2$ content 234 g./l. _____ Chloride 69.0 gm./l.
Viscosity 17.5 cps. at 25.0° C. _ $Fe_2O_3$ .03 gm./l.
pH 0.4 at 25° C. _____ $SiO_2$.
Color slightly amber.
Sp. Gr. 1.26 at 25° C.

It is concentrated further by evaporation (or boiling) to the following composition:

| | |
|---|---|
| Sp. Gr | 1.65 |
| $ZrO_2$ content | 586 g./l. |
| Viscosity | 70 cps. at 25.5° C. |

To the concentrated solution is added yttria stabilizer in the form of yttrium chloride, $YCl_3$. This salt may be purchased commercially, or it can be prepared by reacting the oxide $Y_2O_3$ with a stoichiometric quantity of HCl. The $YCl_3$ solution is made up to a Sp. Gr. of 1.43 and has a $Y_2O_3$ content of 264 gm./liter. 150 ml. of $YCl_3$ solution is mixed with 1.0 liter of ZrOOHCl solution. A typical solution has the following properties:

| | |
|---|---|
| Sp. Gr. | 1.61. |
| Viscosity | 40–50 cp. at 25.5° C. |
| pH | Less than zero. |

Chemical analysis:

| | |
|---|---|
| $ZrO_2$ | 462 gm./l. |
| $Y_2O_3$ | 38.4 gm./l. |
| Cl | 189 gm./l. |
| Rare earth oxide | 1.8 gm./l. |

(B) Representative preferred method for preparing liquid component-acetate base

Zirconium acetate solution, such that that sold by TAM Division of National Lead Company as an aqueous solution, is further concentrated. The "as purchased" properties are:

SOLIDS CONTENT

| | |
|---|---|
| $ZrO_2$ content | 22%. |
| Viscosity | 31 cps. at 25.5° C. |
| pH | 3.8–4.2 at 25° C. |
| Color | Clear white-pale amber. |
| Sp. Gr. | 1.30. |

The above solution is concentrated by evaporation or boiling for cement use to the following composition and properties:

SOLIDS CONTENT

| | |
|---|---|
| $ZrO_2$ content | 379 g./l. |
| Viscosity | 120.3 cps. at 25.5° C. |
| pH | 3.4 at 25° C. |
| Color | Clear white-pale amber. |
| Sp. Gr. | 1.44 |

During concentration by steaming or boiling, the acetate solutions tend to set up as a very thick gel on the bottom of the vessel where heated, requiring frequent mixing. Upon cooling, the thick gel decomposes back to a pourable (lower viscosity) solution.

Yttrium acetate crystals are dissolved in the above concentrated solution in sufficient amount to fully stabilize the $ZrO_2$. The acetate salt is prepared by reacting yttrium oxide powder (99% purity) with hot acetic acid (50% concentration in $H_2O$).

Yttrium acetate has rather low solubility in water and is collected as the crystals on cooling down the reaction solution. The crystals are dried and have a yttria content of 44.1%. The crystals are added to hot Zr acetate solution in which they dissolve readily. Alternatively, the salt can be recovered from the reaction solution simply by drying the solution or the solution can be added directly to the zirconium acetate solution, followed by concentration.

EXAMPLE 2

A representative method of producing yttria-stabilized zirconia powder suitable as a filler material is the following:

(1) Contact sheets of wood pulp, by immersion, in an aqueous solution of zirconium oxychloride and yttrium chloride and having a specific gravity of 1.35 and containing 250 gm./liter $ZrO_2$, 20 gm./liter $Y_2O_3$ and rare earth metal oxide, and 160 gm./liter chloride ion.

(2) After thorough saturation of the solution into the wood pulp (time may vary from several minutes to a day or more), the pulp is centrifuged of excess solution, i.e., solution not absorbed into the pulp.

(3) The wet, salt-loaded pulp is next burned in any convenient manner such as an incinerator, kiln, or the like. During burning the material reaches a maximum temperature of around 1500° to 1800° F. for several minutes.

(4) After the charge has completely burned, the white ash is collected. The ash at this point is a soft, fluffy material composed of loosely agglomerated crystallites of fully-stabilized zirconia. Particle sizes of the crystallites, as determined by X-ray diffraction line broadening analysis and electron microscopy, are in the 200–500 angstrom range. The ash is next broken down to about 100 mesh size in a blender or pulverizer and wet milled for 4–8 hrs. Zirconia beads have been used as the grinding media in small preparations, but other hard grinding media are acceptable. The wet milled powder passes (more than 98%) through a 10 micron sieve and has a mean particle size under one micron. Typical analysis of fully-stabilized wet-milled powder is:

| | Wt. percent |
|---|---|
| $ZrO_2$ content | 92.70 |
| $Y_2O_3$ content | 3.53 |
| $R \cdot E \cdot _2O_3$ content | 2.42 |
| $Fe_2O_3$ content | 0.16 |
| Cl content | 0.09 |
| Moisture content | 0.11 |
| Loss on ignition | 0.24 |

For the preparation of sub-micron sized metal oxide powders other than zirconia for use in the zirconia cement, compounds of other metals can be used to impregnate the wood pulp or other preformed polymeric material such as cotton linters. For instance, aqueous solutions of one or more compounds of yttrium, thorium, beryllium, cerium or other rare earth metal, hafnium, or the like, can be used.

Thereafter, the process employed is analogous to that illustrated above wherein the loaded polymer is ignited to burn off the polymer and produce fragile agglomerates of sub-micron sized metal oxide particles.

The following examples describe the fabrication of yttria-stabilized fibrous zirconia composites utilizing zirconia cement, as described above, to bond zirconia fibers.

EXAMPLE 3

Fabrication and properties of a rocket nozzle throat insert

A composite structure was fabricated suitable for use as a throat insert in a rocket nozzle where a constant throat area (no erosion) is required under an oxidizing environment. The composite was fabricated with zirconia cloth which contained 8 wt. percent yttria and which had the following properties:

| | |
|---|---|
| Cloth construction | Five-harness satin weave. |
| Thickness | 28–31 mils. |
| Weight | 22 oz./yd.[2] |
| Bulk density | 63 lb./ft.[3] |
| Porosity (void content) | 83%. |
| Breaking strength | 6 lb./inch width. |
| Elongation at break | 8%. |

The cement used was prepared by mixing together a ratio of 100 ml. of liquid binder to 150 grams of zirconia powder. The liquid binder contained 35.6 wt. percent $ZrO_2$ in the form of dissolved ZrOOHCl and 2.75 wt. percent $Y_2O_3$ in the form of dissolved $YCl_3$ (8 wt. percent $Y_2O_3$ relative to $ZrO_2$). The $ZrO_2$ powder also contained 8 wt. percent $Y_2O_3$ stabilizer and was prepared as described above by ashing and wet ball-milling $ZrOCl_2$ +$YCl_3$-loaded wood pulp. The $ZrO_2$ cloth was saturated with cement, thoroughly padding cement into both sides of the cloth and removing excess cement from the cloth prior to lamination. The lamination was prepared by cutting round discs 2-inches in diameter from the cement-filled cloth and stacking 100 layers high. The stack was placed in an aluminum die which had been lined with Mylar film. The laminate was pressed at 150 p.s.i., the temperature being raised over a period of three hours to 250° F. After holding for 3 hrs. at 250° F., pressure was released and the laminate removed from the die. (At this point the dried laminate was hard and strong. The cement had been dried and formed a strong, green body.)

The laminate was next cured in a gas-fired kiln, which was raised to 3000° F. over a period of 6 hours and held at 3000° F. for ½ hour. The cured laminate measured approximately 1¾″ high x 1¾″ diameter. A ⅜″ diameter hole was machined in the center of the laminate using diamond-grinding media, such that the cloth layers were normal to the axis of the hole. The finished specimen had a bulk density of 280 lb./ft.$^3$ (4.5 grams/cc.).

In separate tests on zirconia-bonded satin-weave cloth laminates prepared and fired in the manner described above (except that maximum firing temperature was 2800° F.), the properties of such laminates are as follows:

Porosity _____ 32%.
Flexural strength _____ 6,000–8,000 p.s.i.
Modulus of elasticity _____ 3–5×10$^6$ p.s.i.
Coefficient of thermal expansion
  (25–1000° C.) _____ 105×10$^{-7}$ in./in./° C.
Melting point _____ 4800° F.

EXAMPLE 4

Furnace heat shield

The following illustrates the fabrication and use of a zirconia-bonded zirconia cloth laminate for use as a heat shield in a tungsten-heated vacuum furnace.

A four-layer cloth cylinder measuring 4.5 inches inside diameter by 6.0 inches high was fabricated by saturating four strips of satin-weave zirconia cloth (described in Example 3) measuring 6″ wide x 15″ long with zirconia cement analogous to that described in Example 3. The saturated cloths were wrapped around a cardboard cylinder. Each cloth strip overlapped itself by about ½ inch. The overlap was staggered around the cylinder as the four layers were successively applied to the cardboard tube. To hold the cloth in place during drying, an over-wrap of ½-inch wide cotton ribbon was used. The composite was dried by heating the assembly at about 80° C. (176° F.) for ½ hr., and then the temperature was increased over a period of 3 hours to 350° C. (662° F.). At about 300° C. (572° F.) the cardboard mandril and the ribbon overwrap burn off. The laminate was wiped free of ash and fired further to 1000° C. (1832° F.) for 1 hr. The cylinder laminate had a wall thickness of 0.125″ and weighed ¾ lb.

The existing heat shield assembly consisting of five tungsten and tantalum metal cylinders were removed from an electric tungsten resistance-heated vacuum furnace and the zirconia cylinder substituted in its place. Six holes were cut in the cylinder wall to accommodate the water-cooled heater posts and positioning rods. One advantage of this zirconia composite structure is that it may be cut and shaped easily with inexpensive machine shop tools. The holes in the cylinder wall were a complex shape, but were made using a backsaw blade and a file. The composite was found to be as effective as a heat shield as the five metal cylinders. The furnace and the cylindrical laminate was used for several dozen heat cycles in a testing program of other items over a temperature range of 1000–2300° C.

At a furnace temperature of 4030° F. (2220° C.), i.e., inside the tungsten heating elements, the temperature of the inside and outside walls of the laminate was 3360° F. (1850° C.) and 1790° F. (980° C.), respectively.

Out-gassing of the laminate proved to be no problem. After heating, the laminate hardened and was stronger than before.

EXAMPLE 5

Heat shields (flame barriers)

Three-layer, six-layer and twelve-layer cloth composites were fabricated in a manner analogous to that described in Example 4, except that they were dried and cured to 1800° F. between flat silica plates (under no pressure). Physical properties of the three laminates are listed below:

| | Thickness, inch | Weight, lb./ft.$^2$ | Density | |
|---|---|---|---|---|
| | | | Lb./ft.$^3$ | Percent of theory [1] |
| Number of layers: | | | | |
| 3 | 0.087 | 0.89 | 123 | 33 |
| 6 | 0.143 | 1.94 | 163 | 44 |
| 12 | 0.286 | 3.80 | 160 | 43 |

[1] Theoretical density is 370 lb./ft.$^3$

The laminates were deployed as heat shields on a gas-fired impingement burner which operated in air. The backface of the heat shield radiated to the room environment. The table below lists typical performance data. It is obvious from the large temperature drops (difference between front and backface temperatures) effected by the thin laminates that they serve as very efficient heat shields and flame barriers.

HEAT SHIELD PROPERTIES OF ZIRCONIA LAMINATES

| Front face temp., °F. (optical pyrometer measurement) | Back face temp., °F. | | |
|---|---|---|---|
| | (3 layers 87 mils) | 6 layers (143 mils) | 12 layers (286 mils) |
| 3,400 | 2,400 | 2,100 | |
| 3,700 | 2,600 | 2,300 | |
| 4,300 | 3,000 | 2,600 | |
| 4,500 | 3,100 | 2,800 | 1,800 |

EXAMPLE 6

Representative illustration of the use of zircon powder in the zirconia cement The fabrication of a free-standing composite tube ½″ I.D. by 12″ long using zirconia bias-braid tape and cement which incorporates zircon powder as the filler is described.

A removable mandrel was used to fabricate the tube. The mandril was a steel rod ½″ in diameter by 20″ long, which had been coated with .020″ thick Teflon to aid in slipping the fabricated composite tube from the mandrel after drying. The cement used in saturating the bias-braid tape prior to lay-up contained zircon powder purchased from M and T Chemicals, Incorporated, of Rahway, N.J. The zircon powder used was grade Ultrox 1000W, a wet-milled zircon, having an average particle size of 0.7 micron. This grade of zircon is commonly used as an opacifier in glass and enamel and in the production of dense zircon refractories. The liquid portion of the cement was composed of zirconium hydroxychloride and yttrium chloride made up to the same specifications as Example 1. 400 grams of zircon powder was mixed with 266 milliliters of the liquid. ⅜″ wide bias-braid zirconia tape, havng a tensle strength of 16 lbs., was thoroughly saturated wth the cement and wrapped in a spiral fashion around the steel mandrel, 4 layers were applied over each other to build up the thickness of the tube. Before the cement was allowed to dry, an overwrap of rayon yarn was applied under 4 lb. tension to press the layers of tape together (to make a more dense composite structure). (The yarn burns off in the curing step.)

The mandrel and the tape-wrap was next placed in an air oven at 90° C. to dry. After about 1 hr., the temperature was increased to 200° C. over a period of 3 hrs., and held for ½ hr. at 200° C. After cooling, the rigidized composite tube was removed, slipped off of the steel mandrel, and further cured by heating over a period of 3 hrs. to 600° C. with a 1 hr. hold period at 600° C.

The four-layer tube had a wall thickness of 0.046". It contained 45–50 wt. percent zircon powder and had a bulk density of 3.65 gm./cc. (228 lbs./ft.$^3$). The tube fired to 600° C. had a compressive strength in the direction of the axis of 8200 p.s.i. A piece of the tube was fired to 1316° C. for 4 hrs. Its compressive strength was 8400 p.s.i. Another section of the tube was then fired to 1500° C. for 16 hrs. in air, and exhibited a compressive strength of 9500 p.s.i. (Note: It is seen from the compressive strength that excellent strength was obtained after curing to only 600° C. and further heat treatment to 1316° and 1500° C. did not substantially increase the strength of the composite.) A tube such as that fabricated in this example can be used for transferring molten metals.

What is claimed is:

1. A composite comprising an intimate mixture of fibrous zirconia and a refractory powder in a matrix of microporous zirconia.

2. The composite of claim 1 wherein the fibrous zirconia is in the form of yarn, felt, or woven fabric.

3. The composite of claim 1 wherein the zirconia in both the fibrous phase and matrix phase contains a stabilizing amount of a stabilizing metal oxide.

4. The composite of claim 3 wherein the stabilizing metal oxide is yttria.

5. The composite of claim 1 wherein said composite has a bulk density of from about 0.5 to about 5.5 grams per cubic centimeter.

6. The composite of claim 1 wherein said composite has a porosity of from about 10 percent to about 92 percent.

7. A composite suitable for use as thermal insulation comprising fibrous stabilized zirconia and a refractory powder in a matrix of microporous stabilized zirconia, said composite having a bulk density of from about 2 to about 5.5 grams per cubic centimeter.

8. A hard, rigid composite comprising fibrous stabilized zirconia and a refractory powder in a matrix of microporous stabilized zirconia, said composite having a bulk density of from about 2 to about 5.5 grams per cubic centimeter.

9. The composite of claim 1 wherein the refractory powder is zirconia or zircon.

10. A method for producing composites which comprises:
    (a) impregnating fibrous zirconia with a mixture of a liquid containing a zirconium compound and a refractory powder; and
    (b) subjecting the thus impregnated fibrous zirconia to a temperature sufficient to convert said zirconium compound to zirconia.

11. The method of claim 10 wherein said liquid containing a zirconium compound is an aqueous solution of a zirconium compound.

12. The method of claim 10 wherein said refractory powder is zirconia powder or zircon.

13. The method of claim 12 wherein the liquid containing the zirconium compound is an aqueous solution of a zirconium compound.

14. The method of claim 13 wherein step (b) is carried out by heating the impregnated fibrous zirconia to a temperature of at least about 1100° F.

15. The method of claim 13 wherein step (b) is carried out by heating the impregnated fibrous zirconia to a temperature of at least about 1500° F.

16. The method of claim 13 wherein the impregnated fibrous zirconia is heated to a temperature of at least about 2000° F.

17. A method for producing composites which comprises:
    (a) impregnating fibrous zirconia with a mixture of an aqueous solution of a zirconium compound and a refractory powder;
    (b) heating the thus formed impregnated fibrous zirconia to a temperature sufficient to volatilize the water contained in said aqueous solution; and
    (c) subjecting the dried impregnated fibrous zirconia product of step (b) to a temperature sufficient to convert said zirconium compound to zirconia.

18. The method of claim 17 wherein said zirconium compound is zirconium acetate or zirconium hydroxychloride.

19. The method of claim 17 wherein the aqueous solution of a zirconium compound also contains dissolved therein a compound of a metal whose oxide stabilizes the zirconia.

20. The method of claim 19 wherein said metal is yttrium.

21. The method of claim 17 wherein step (b) is carried out at a temperature of from about 190° to about 300° F., and wherein step (c) is carried out at a temperature of at least about 1100° F.

22. The method of claim 21 wherein step (c) is carried out at a temperature of at least about 1500° F.

23. The method of claim 11 wherein said aqueous solution also contains dissolved therein a small amount of aluminum or magnesium.

24. The method of caim 17 wherein said aqueous solution also contains dissolved therein a small amount of aluminum or magnesium.

References Cited

UNITED STATES PATENTS

| | | | |
|---|---|---|---|
| 3,434,854 | 3/1969 | Voss | 106—57 |
| 3,385,915 | 5/1968 | Hamling | 106—57 |

JAMES E. POER, Primary Examiner

U.S. Cl. X.R.

252—62